(12) United States Patent
Truong et al.

(10) Patent No.: US 10,769,172 B2
(45) Date of Patent: Sep. 8, 2020

(54) GLOBALIZED OBJECT NAMES IN A GLOBAL NAMESPACE

(71) Applicant: HEWLETT PACKARD ENTERPRISE DEVELOPMENT LP, Houston, TX (US)

(72) Inventors: Nguyen Truong, Mooresville, NC (US); Kevin Kauffman, Durham, NC (US); Gurunatha Karaje, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 248 days.

(21) Appl. No.: 15/938,584

(22) Filed: Mar. 28, 2018

(65) Prior Publication Data

US 2019/0303489 A1 Oct. 3, 2019

(51) Int. Cl.
*G06F 17/00* (2019.01)
*G06F 16/27* (2019.01)
*G06F 16/25* (2019.01)
*G06F 16/28* (2019.01)

(52) U.S. Cl.
CPC ............ *G06F 16/27* (2019.01); *G06F 16/258* (2019.01); *G06F 16/285* (2019.01)

(58) Field of Classification Search
CPC ....... G06F 16/27; G06F 16/285; G06F 16/258
See application file for complete search history.

(56) References Cited

U.S. PATENT DOCUMENTS

| | | | |
|---|---|---|---|
| 5,588,147 A | 12/1996 | Neeman et al. | |
| 7,512,638 B2 | 3/2009 | Jhaveri et al. | |
| 7,778,963 B2 | 8/2010 | Novik et al. | |
| 7,962,672 B1* | 6/2011 | Martin | G06F 3/0605 340/2.1 |
| 8,060,776 B1 | 11/2011 | Schoenthal et al. | |
| 8,850,145 B1* | 9/2014 | Haase | G06F 11/1435 711/162 |
| 9,047,169 B1* | 6/2015 | Haase | G06F 12/00 |
| 9,235,595 B2 | 1/2016 | Wang et al. | |
| 9,703,803 B2 | 7/2017 | Bachar et al. | |
| 2009/0106242 A1* | 4/2009 | McGrew | G06F 16/258 |
| 2015/0256510 A1* | 9/2015 | Cederbaum | G06F 16/27 709/245 |
| 2016/0019284 A1* | 1/2016 | Sankar | G06F 16/285 707/706 |

(Continued)

FOREIGN PATENT DOCUMENTS

WO WO-2016190870 12/2016

OTHER PUBLICATIONS

O.T. Anderson et al., Global Namespace for Files, IBM Systems Journal, vol. 43, Issue 4, Journal Article, pp. 702-722, (Year: 2004).*

(Continued)

*Primary Examiner* — Greta L Robinson

(74) *Attorney, Agent, or Firm* — Hewlett Packard Enterprise Patent Department

(57) ABSTRACT

Examples include globalized object names in a global namespace. Some examples may relate to creation of an object with a globalized object name in a global namespace based on a determination. The determination may relate to a global namespace name pattern or the determination may be based on globalization information.

17 Claims, 5 Drawing Sheets

(56) References Cited

U.S. PATENT DOCUMENTS

2017/0316044 A1* 11/2017 Mohan ................ H04L 61/1511

OTHER PUBLICATIONS

Netapp, Inc., "NetApp FAS/V-Series Storage Replication Adapter 2.0.1 for Clustered Data Ontap," (Research Paper), Jun. 2013, 35 pages, https://library.netapp.com/ecm/ecm_download_file/ECMP1224502.

Wikipedia, "Universally unique identifier," Mar. 22, 2018, <https://en.wikipedia.org/w/index.php?title=Universally_unique_identifier&oldid=831934972>.

* cited by examiner

GLOBALIZED OBJECT NAMES IN A GLOBAL NAMESPACE

BACKGROUND

Data stored on a computing device may be vulnerable to loss or unavailability. For example, data stored on a storage array may become unavailable if a connection to the storage array is lost, or if there is a failure at the storage array. In some cases, a failure at a storage array may result in the permanent loss of data being stored at the storage array. To protect against data becoming unavailable or being lost, data replication may be performed to store data in multiple locations (e.g., two different storage arrays). In such examples, when data is lost or inaccessible at one of the locations, then the data may still be accessible at one of the other location(s).

BRIEF DESCRIPTION OF THE DRAWINGS

The following detailed description references the drawings, wherein.

DETAILED DESCRIPTION

Figure 1:
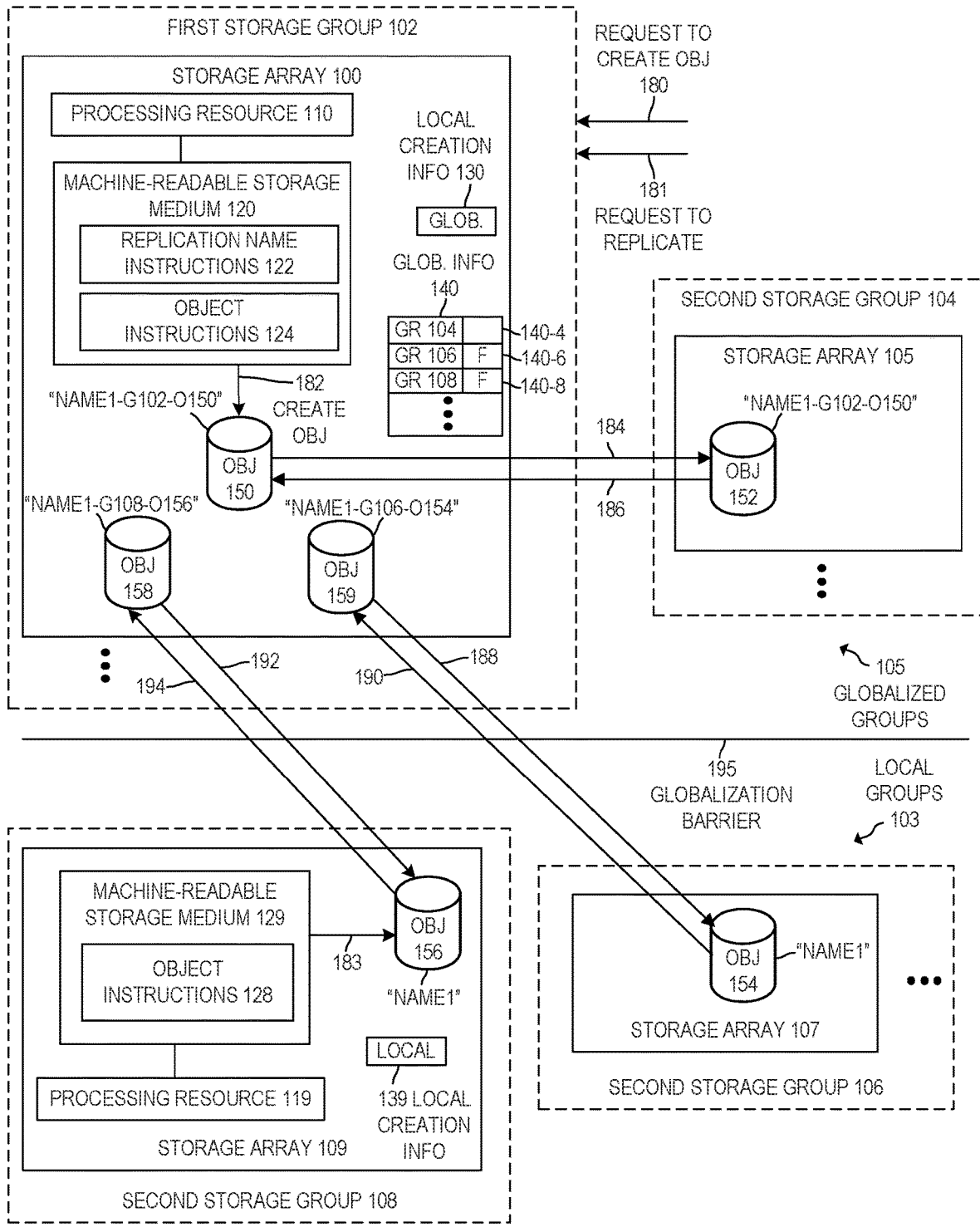
FIG. 1 is a block diagram of an example replication environment including a storage group to create a downstream object.

In some examples, data replication technology may replicate an object, such as a volume or the like, from an upstream storage group to a downstream storage group. In examples described herein, a "storage group" may be a storage array (or other computing device to store data) or may be a collection of one or more storage array(s) (or other computing device(s) to store data) that are logically grouped together (e.g., for functionalities such as replication).

In examples described herein, an "upstream" storage group may be a storage group that is to operate as a source for a given replication relationship, and a "downstream" storage group may be a storage group that is to operate as a destination for a given replication relationship. For example, an upstream storage group may store a given object and may replicate the object (e.g., copy the contents of the object) to another version of the object created at a downstream storage group. For example, an object may be a volume, a collection of volumes (e.g., a "volume collection"), a policy, or the like. In examples described herein, a volume may be a logical unit of storage to which storage locations in physical storage (e.g., storage device(s) in storage array(s)) may be allocated for storage of data.

In examples described herein, the version of the object at the upstream storage group may be referred to as an "upstream object" and the version of the object created at the downstream storage group may be referred to as a "downstream object". In some examples, a storage group may be both an upstream storage group for one or more objects (e.g., the source storage group in the replication relationships for those objects) and a downstream storage group for one or more objects (e.g., the destination storage group in the replication relationships for those objects). Each object of a storage group has a name (referred to as its "object name") by which the object is identified in the storage group. In examples described herein, an object name of an upstream object may be referred to as an "upstream object name", and an object name of a downstream object may be referred to as a "downstream object name".

In examples described herein, when an upstream storage group is to replicate an upstream object to a downstream storage group, a downstream object may be created at the downstream storage group to be the destination of the replication. In some examples, the downstream object may be created with the same object name as the upstream object on the upstream storage group. However, a conflict may occur when an object with the same object name as the upstream object already exists on the downstream array. In such examples, the downstream array may prevent the creation of the downstream object due to the name conflict, and the replication for the upstream object may halt. In a single-tenant environment, in which both the upstream group and the downstream group are associated exclusively with a single tenant (e.g., company, organization, individual, entity, etc.), an acceptable work-around may be to have the tenant rename the upstream object to avoid the conflict.

However, such a work-around may not be acceptable in a multi-tenant environment, for example, in which a multi-tenant storage group may receive replication of objects from different upstream storage groups associated with different tenants. For example, it may be inconvenient for a tenant to change the name of an upstream object each time such a name conflicts with the name of any other tenant's object on a multi-tenant storage group, particularly as different tenants neither know nor control each other's object names. In such examples, it may also be unacceptable to reject replication of an upstream object of one tenant because its name conflicts with the object name of an object of another tenant at the downstream group, as that may reveal to one tenant (e.g., the one associated with the rejected object) an object name used by the other tenant.

To address these issues, examples described herein may avoid such object name conflicts by, for example, utilizing a global namespace of globalized object names in a multi-tenant storage group, wherein object names outside of the global namespace (which may conflict across different tenants) are globalized to the global namespace to be used in the multi-tenant storage group. In some examples, a multi-tenant storage group may track which storage groups utilize the global namespace and which do not, and may selectively globalize or de-globalize object names when communicating with these different types of storage groups. For example, a multi-tenant storage group may de-globalize object names when communicating to storage groups using names outside of the global namespace. In some examples, different storage groups that all utilize object names in the global namespace may replicate objects and communicate with one another regarding objects without globalizing or de-globalizing object names.

In this manner, examples described herein may avoid object name conflicts at multi-tenant storage groups without modifying object names at storage groups replicating to multi-tenant storage group(s).

Referring now to the drawings, FIG. 1 is a block diagram of an example replication environment including a storage group 102 to create a downstream object. The replication environment of FIG. 1 may include globalized storage groups 105 that generate and use "globalized object names," which are object names that are in a defined global namespace. Globalized storage groups 105 may include storage groups 102 and 104 of FIG. 1, for example. In some examples, storage group 102 may at least partially implement a multi-tenant replication environment utilizing the global namespace.

In the example of FIG. 1, storage group 102 may be a collection of one or more storage arrays, including a storage array 100. In other examples, storage group 102 may be a storage array, such as storage array 100. In the example of FIG. 1, storage array 100 may include at least one processing resource 110, and at least one machine-readable storage medium 120 comprising (e.g., encoded with) at least instructions 122 and 124 that are executable by the at least one processing resource 110 of storage array 100 to implement functionalities described herein in relation to instructions 122 and 124. Storage group 104 may be a collection of one or more storage arrays, including a storage array 105. In other examples, storage group 104 may be a storage array, such as storage array 105.

The replication environment of FIG. 1 may also include local storage groups 103 that do not globalize object names to the global namespace for use. Local storage groups 103 may include storage groups 106 and 108 in the example of FIG. 1, for example. In the example of FIG. 1, storage group 108 may be a collection of one or more storage arrays, including a storage array 109. In other examples, storage group 108 may be a storage array, such as storage array 109. In the example of FIG. 1, storage array 109 may include at least one processing resource 119, and at least one machine-readable storage medium 129 comprising (e.g., encoded with) at least instructions 128 that are executable by the at least one processing resource 119 of storage array 109 to implement functionalities described herein in relation to instructions 128. Storage group 106 may be a collection of one or more storage arrays, including a storage array 107. In other examples, storage group 106 may be a storage array, such as storage array 107. In the example of FIG. 1, storage groups 102, 104, 106, and 107 may communicate with one another via direct connection(s) (e.g., wired or wireless, etc.), via at least one computer network, or a combination thereof. In examples described herein, a computer network may include, for example, a local area network (LAN), a virtual LAN (VLAN), a wireless local area network (WLAN), a virtual private network (VPN), the Internet, or the like, or a combination thereof.

As noted above, globalized storage groups 105 generate and utilize globalized object names in the global namespace, and local storage groups 103 do not globalize object names to the global namespace for use. For purposes of explanation, FIG. 1 includes illustration of a conceptual name globalization barrier 195 that will be described in more detail below. In some examples, different local storage groups 103 may each have an object with the same object name. In the example of FIG. 1, for example, storage group 106 may have an object 154 with an object name "NAME1" and storage group 108 may have an object 156 with the same object name of "NAME1". If those objects 154 and 156 with the same name were replicated to the same storage group (e.g., a multi-tenant storage group) with the same name, then the names may conflict, as described above.

In examples described herein, a storage group 102 may prevent such a conflict when the objects are replicated to storage group 102 by globalizing the object names of objects being replicated to storage group 102, when those object names are not in the global namespace. In some examples, instructions 122, when executed, may globalize an object name by adding information to the object name such that the name is unique within the replication environment. In some examples, the added information may include information associated with the upstream storage group from which the object is being replicated. In some examples, by adding such information, object names that might have conflicted may be modified such that they do not conflict, since, in such examples, object names from different storage groups may have different information added to them when they are globalized (since the added information may be associated with different storage groups). Some explanatory examples are described below.

For example, instructions 122 may globalize object names by adding (e.g., appending), to the object name, a suffix including the information to be added. For example, the suffix may comprise a group identifier for the storage group in which the object was created, and the object identifier for the object within the storage group where the object was created.

One example of object name globalization is shown and described herein in relation to FIG. 1, with example globalized object names illustrated according to an example format (or global namespace name pattern), which is used for simplicity of illustration and explanation in relation to FIG. 1. In other examples, globalized object names may have any other suitable format (or utilize any other suitable different global namespace name pattern), as described in more detail below.

In the example of FIG. 1, in order to receive replication of upstream object 156 having object name "NAME1" from storage group 108, instructions 122 of storage group 102 may create a downstream object 158 with the globalized object name "NAME1-G108-O156" to receive the replication. In this example, the globalized object name "NAME1-G108-O156" may comprise a prefix of the object name "NAME1" and a suffix associated with the storage group of the upstream object 156. For example, the suffix "-G108-O156" may include a first portion "G108" representing an identifier of storage group 108, and a second portion "O156" representing an identifier of object 156 in storage group 108. Representative (and not actual) storage group identifiers and object identifiers are used in the example of FIG. 1 for ease of illustration an understanding. Example implementations may use actual identifiers utilized by the storage groups, or the like.

In such examples, to receive replication of upstream object 154 having object name "NAME1" from storage group 106, instructions 122 may create a downstream object 159 with the globalized object name "NAME1-G106-O154", including prefix "NAME1" and suffix portions "G106" (associated with storage group 106) and "O154" (associated with object 154 on storage group 106), for example. In this manner, by globalizing each of the object names instructions 122 may avoid a name conflict between the downstream volumes for objects 154 and 156 at storage group 102. For example, instructions 122 may globalize the object name "NAME1" differently for each of objects 154 and 156 by adding, to each of the object names, information associated with the respective storage groups on which they are stored (e.g., on which they were created). In such examples, by globalizing the object names differently as described herein, storage group 102 may avoid object name conflicts when objects with the same object name on their respective storage groups are replicated to the same storage group 102.

In examples described herein, a "global namespace" may comprise the set of names (e.g., strings) that match a global namespace name pattern, and may exclude any name (e.g., string) that does not match global namespace name pattern. In examples described herein, a "global namespace name pattern" may be a defined string pattern, wherein globalized object names are constructed to match the global namespace name pattern. In the example of FIG. 1, the global namespace may comprise object names that match a global namespace name pattern defined to match strings with a prefix followed by a delimiter (e.g., "-") then a suffix including a first portion (e.g., having a length and format of a storage group identifier) and a second portion (e.g., having a length and format of an object identifier), wherein the first and second portions are separated by a delimiter (e.g., "-"). In some examples, the global namespace may be a namespace that is reserved for globalized object names generated by globalized storage groups.

In some examples, instructions 122 may de-globalize globalized object names when communicating to storage groups that do not utilize the globalized namespace, such as storage groups 106 and 108. In this manner, storage group 102 may utilize object names in the globalized namespace (e.g., to avoid conflicts), while allowing other storage groups to utilize object names that are not in the global namespace (e.g., for compatibility with storage groups that do not utilize object names in the global namespace). In some examples, to de-globalize a globalized object name, instructions 122 may strip a suffix from the object name (e.g., the suffix added to globalize the object name). For example, when communicating to storage group 108 about object 156, instructions 122 may de-globalize globalized object name "NAME1-G108-O156" to "NAME1". In such examples, when communicating to storage group 106 about object 154, instructions 122 may de-globalize globalized object name "NAME1-G106-O154" to "NAME1".

In some examples, globalized storage groups 105, which all utilize object names in the globalized namespace, may replicate objects and communicate to one another about objects without globalizing or de-globalizing object names. For example, storage group 102 may replicate object 150 to storage group 104 and communicate with storage group 104 about object 150 without de-globalizing the globalized object name "NAME1-G102-O150" of object 150. In such examples, For example, storage group 104 may create downstream object 152 with the already-globalized object name "NAME1-G102-O150" (i.e., without globalizing the object name on storage group 104). As described in more detail below, instructions 122 may store globalization information 140, which it may use to determine whether an incoming object name from another storage group is to be globalized and whether a globalized object name is to be de-globalized for outgoing communication with another storage group.

In this manner, examples described herein may avoid object name conflicts when replicating between storage groups (e.g., single-tenant storage groups) that do not use a global namespace and globalized storage groups (e.g., multi-tenant storage groups) that use the global namespace, and when replicating between multiple globalized storage groups (e.g., multi-tenant storage groups) that use the global namespace.

An example of creation of a downstream object with an appropriate object name is described below in relation to FIGS. 1 and 2. For ease of description, storage group 102 may be referred to herein as a "first" storage group, and each of storage groups 104, 106, and 108 may be referred to herein as a "second" storage group.

Figure 2:
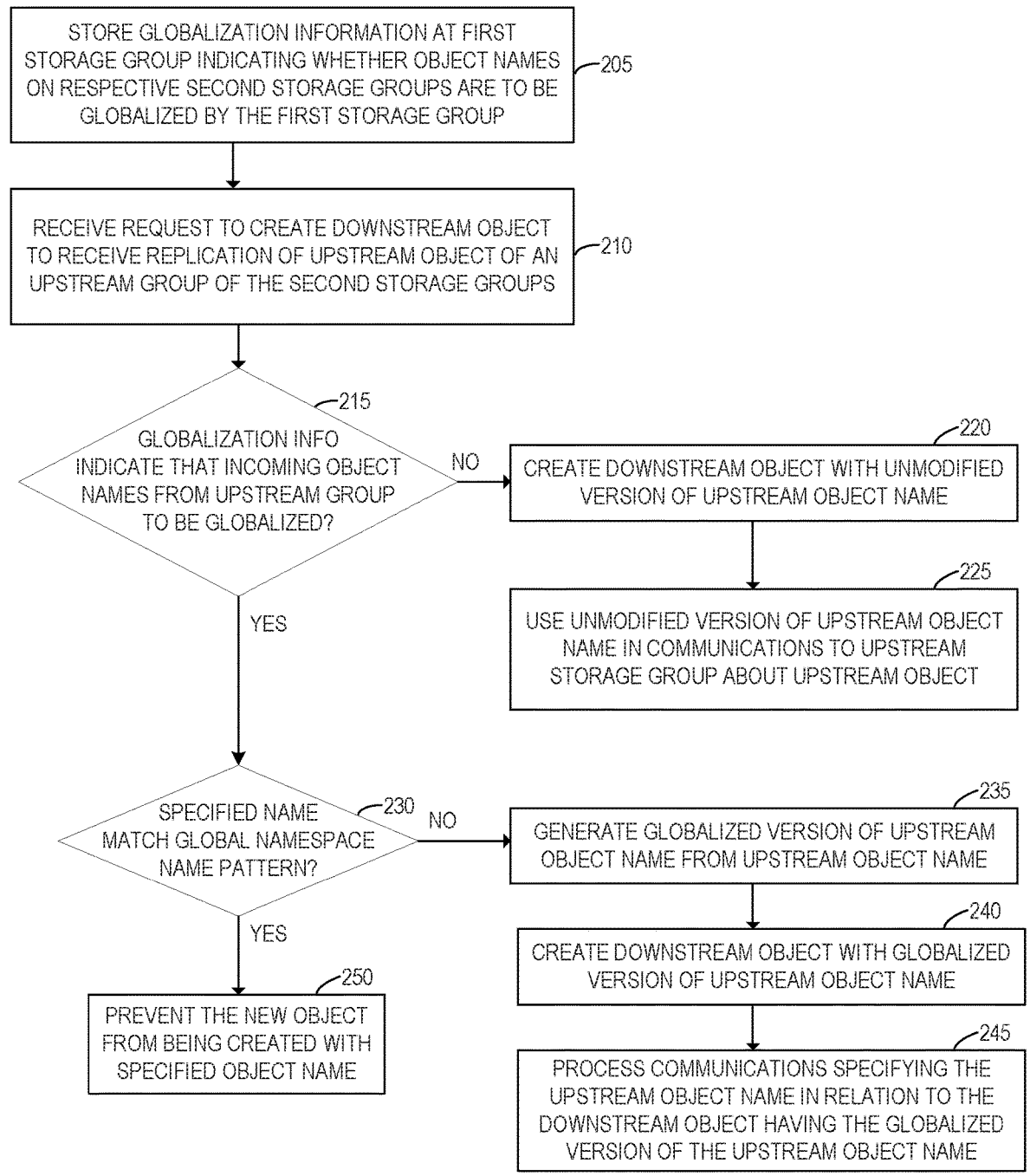
FIG. 2 is a flowchart of an example method including creation of a downstream object on a storage group.

FIG. 2 is a flowchart of an example method 200 including creation of a downstream object on a storage group. Although execution of method 200 is described below with reference to storage group 102, other storage group(s), storage array(s), or computing device(s) suitable for the execution of method 200 may be utilized (e.g., storage group 302 of FIG. 3). Additionally, implementation of method 200 is not limited to such examples.

Referring to FIGS. 1 and 2, at 205 of method 200, instructions 122, when executed, may store globalization information 140 at first storage group 102 (e.g., in storage of storage array 100). In examples described herein, "globalization information" stored at a given storage group may be information that indicates, for each of a plurality of other storage groups, whether object names used on that other storage group are to be globalized to a global namespace by the given storage group when object names are incoming to the given storage group from the other storage group (i.e., in communication(s) from the other storage group). In some examples, the globalization information may represent settings for a storage group indicating whether to globalize incoming object names from (i.e., used by) other (e.g., partner) storage groups, respectively. In the example of FIG. 1, for example, globalization information 140 may indicate, for each respective second storage group of second storage groups 104, 106, and 108, whether incoming object names from the respective second storage group are to be globalized to a global namespace by first storage group 102. As an example, globalization information 140 may comprise a "globalize object names" flag (e.g., "F") for each second storage group whose object names are to be globalized to the global namespace by storage group 102, when incoming to storage group 102, to be used by storage group 102.

In the example of FIG. 1, second storage groups 106 and 108 are local storage groups 103 that do not globalize object names to the global namespace for use, so globalization information 140 may indicate that incoming object names from each of second storage groups 106 and 108 are to be globalized to the global namespace by first storage group 102 when incoming to first storage group 102. For example, globalization information 140 may include information 140-6, which indicates (e.g., by presence of a flag "F") that incoming object names from second storage group 106 are to be globalized to the global namespace by first storage group 102. Globalization information 140 may also include information 140-8, which indicates (e.g., by presence of a flag "F") that incoming object names from second storage group 108 are to be globalized to the global namespace by first storage group 102.

In the example of FIG. 1, globalization information 140 also indicate that incoming object names from second storage group 104 are not to be globalized to the global namespace by first storage group 102, since second storage group 104 is a globalized storage group that generates globalized object names in the global namespace and utilizes. For example, globalization information 140 may include a null value as information 140-4 (e.g., may not include a flag "F" for storage group 140) to indicate that incoming object names from second storage group 104 are not to be globalized first storage group 102, since they are already globalized by storage group 104.

In examples described herein, at 205, instructions 122 may receive (e.g., passively receive, retrieve, acquire, etc.) globalization information 140 from any suitable source and store globalization information 140 in any suitable storage (e.g., machine-readable storage medium) of storage group 102 (e.g., of storage array 100). For example, instructions 122 may receive globalization information 140 via any suitable input interface, such as an application programming interface (API), a graphical user interface (GUI), a command line interface (CLI), or the like, or a combination thereof. In some examples, instructions 122 may receive globalization information 140 that is input by a user (e.g., administrator or the like). In examples described herein, globalization information 140 may be stored in any suitable format. Although globalization information 140 is represented by presence or absence of a flag "F" for each of the second storage groups in the example illustrated in FIG. 1, globalization information 140 may represented in any other suitable format, data structure, etc., in other examples.

At 210, instructions 122, when executed, may receive (e.g., passively receive, retrieve, acquire, etc.) a request 181 to create a downstream object on first storage group 102 to receive replication of an upstream object of an upstream storage group of the plurality of second storage groups. The request 181 may specify an upstream object name of the upstream object at the upstream storage group. In such examples, based on the stored globalization information 140 for the upstream storage group, instructions 122, when executed, may determine whether to create a downstream object at first storage group 102 with an unmodified version of the upstream object name or with a globalized version of the upstream object name generated by first storage group 102. In such examples, instructions 122 may then create the downstream object at first storage group 102 based on the determination.

In one example, instructions 122 of first storage group 102 may receive a request 181 to create a downstream object on first storage group 102 to receive replication of an upstream object 156 of an upstream storage group 108 (of the plurality of second storage groups). In such examples, the request 181 may specify an upstream object name of "NAME1" of the upstream object 156 at the upstream storage group 108.

In such examples, at 215, instructions 122 may determine that globalization information 140 indicates that incoming object names from (i.e., used on) upstream storage group 108 are to be globalized by first storage group 102 (i.e., "YES" at 215). In the example of FIG. 1, for example, instructions 122 may determine that globalization information 140 includes a flag "F" (illustrated as information 140-8), which indicates that incoming object names from upstream storage group 108 are to be globalized by first storage group 102.

Based on that determination at 215 (i.e., "YES" at 215), at 230, instructions 122 may determine, at 230, whether the upstream object name of upstream object 156 (i.e., the unmodified upstream object name of upstream object 156) matches a global namespace name pattern for object names in a global namespace. If so (i.e., "YES" at 230), then at 250, instructions 122 may disallow creation of the downstream object at first storage group 120. In this manner, examples described herein may prevent errors when attempting to globalize an upstream object name that is already in the global namespace (i.e., matches the global namespace name pattern). Though local storage groups 103 do not globalize object names, an object name in the global namespace could still be used (e.g., inadvertently) at a local storage group 103. In such cases, examples described herein may disallow replication to a globalized storage group 105, as it may cause a potential mismatch if the name is later de-globalized (as described below) for communication back to the local storage group 103, as the de-globalized name in this case may not match the original upstream object name used at the local storage group.

Alternatively, instructions 122 may determine at 230 that the upstream object name of upstream object 156 (i.e., the unmodified upstream object name of upstream object 156) does not match the global namespace name pattern for object names in the global namespace (i.e., "NO" at 230). In the example of FIG. 1, for example, instructions 122 may determine at 230 that the upstream object name "NAME1" of upstream object 156 does not match the global namespace name pattern (i.e., "NO" at 230). In such examples, based on the determination at 215 that globalization information 140 indicates that incoming object names from upstream storage group 108 are to be globalized by first storage group 102 ("YES" at 215) and based on the determination that the upstream object name "NAME1" of upstream object 156 does not match the global namespace name pattern (i.e., "NO" at 230), instructions 122 may generate a globalized version of the upstream object name at 235. In such examples, the globalized version of the upstream object name instructions 122 may be in the global namespace. In the example of FIG. 1, for example, at 235, instructions 122 may generate a globalized version "NAME1-G108-O156" of upstream object name "NAME1", as described above, where the globalized version is in the global namespace. Method 200 may then proceed to 240, where instructions 122 may create downstream object 158 at first storage group 102 with the generated globalized version of the upstream object name (i.e., "NAME1-G108-O156") as the name of the downstream object 158 at first storage group 102.

As described above, in some examples, instructions 122 may globalize object names by adding information to the object names. In examples described in relation to FIGS. 1 and 2, instructions 122 may obtain the additional information from the request 181. For example, request 181 to create downstream object 158 of upstream object 156 may include a group identifier for storage group 108 (represented by "G108" in FIG. 1), and an object identifier used for object 156 in storage group 108 (the object identifier represented by "O156" in FIG. 1). In the example of FIG. 1, instructions 122 may use this provided information to generate the globalized object name "NAME1-G108-O156" for downstream object 158. In some examples, first storage group 102 may receive request 181 from storage group 108.

At 245, instructions 122 of storage group 102 may receive, from upstream storage group 108, a communications 194 that specifies an object having an unmodified object name, such as "NAME1" for object 156 at storage group 108. In such examples, instructions 122 may determine whether globalization information 140 indicates that incoming object names from (i.e., used on) upstream storage group 108 are to be globalized by storage group 102. In the example of FIG. 1, instructions 122 may determine that globalization information 140 (e.g., information 140-8) indicates that incoming object names from upstream storage group 108 are to be globalized by storage group 102, as described above. Based on that determination, instructions 122 may generate the globalized version, "NAME1-G108-O156", of the unmodified object name, "NAME1", as described above, and may process the communication 194 in relation to the downstream object 158 having the globalized version "NAME1-G108-O156" of the upstream object name "NAME1". Communication 194 may be any request, provision of data and/or metadata, or the like, to be processed against or applied to object 158.

In such examples, the communication 194 may include the additional information used to generate the globalized version (e.g., the storage group identifier and the object identifier). In some examples, for any communication from a local storage group 103 to a globalized storage group 105 about an object having an object name that is not in the globalized namespace, the globalized storage group 105 (e.g., instructions such as instructions 122) may generate the globalized version of the object name and process the communication against the version of the object on the globalized storage group 105. This may be visualized with the aid of conceptual name globalization barrier 195. In examples described herein, object names may be globalized (e.g., by instructions 122 or the like of a globalized storage group 105) when they have crossed name globalization barrier 195 from the local storage group 103 side to the globalized storage group 105 side (as determined in relation to globalization information 140, as described above). In such examples, object names may also be de-globalized (e.g., by instructions 122 or the like of a globalized storage group 105) when crossing name globalization barrier 195 from the globalized storage group 105 side to the local storage group 103 (as determined in relation to globalization information 140, as described below). In some examples, instructions 122 may similarly globalize object name "NAME1", in communications 190, to globalized object name "NAME1-G106-O154" and process communication 190 against object 159. In examples described herein, storage groups on the globalized storage group 105 side of globalization barrier 195 (e.g., above globalization barrier 195 in the example of FIG. 1) perform the globalization and de-globalization of object names, while storage groups on the local storage group 103 side of globalization barrier 195 (e.g., below globalization barrier 195 in the example of FIG. 1) do not globalize or de-globalize object names, as described herein.

For example, storage group 102 may communicate to local storage group 108 about a downstream object 158 having globalized object name "NAME1-G108-O156" on storage group 102, which corresponds to upstream object 156 having object name "NAME1" on storage group 108. In such examples, instructions 122 may determine whether globalization information 140 indicates that incoming object names from the storage group are 108 to be globalized by storage group 102. In the example of FIG. 1, instructions 122 may determine that globalization information 140 (e.g., information 140-8) indicates that incoming object names from the storage group 108 are to be globalized by storage group 102. Based on that determination, instructions 122 may convert the object name "NAME1-G108-O156" of object 158 (e.g., downstream object 158) to a de-globalized object name "NAME1" that is not in the global namespace. In some examples, instructions 122 may de-globalize the object name "NAME1-G108-O156" of object 158 by removing the suffix that was added to globalize the object name "NAME1" (e.g., removing suffix "-G108-O156"). In such examples, instructions 122 may then use the de-globalized object name "NAME1" in a communication 192 from storage group 102 to storage group 108 about the upstream object 156 (i.e., across the name globalization barrier 195). In some examples, instructions 122 may similarly de-globalize object name "NAME1-G106-O154" to "NAME1" for use in communications 188 to storage group 106 about object 154.

Referring again to FIGS. 1 and 2, in other examples, request 181 received by instructions 122 at 210 may be a request to create a downstream object on first storage group 102 to receive replication of an upstream object of an upstream storage group 104 (of the plurality of second storage groups). In such examples, the request 181 may specify an upstream object name of "NAME2-G104-O159" of the upstream object (not shown) at the upstream storage group 104. In such examples, at 215, instructions 122 may determine that globalization information 140 (e.g., information 140-4) indicates that incoming object names from upstream storage group 108 are not to be globalized by first storage group 102 (i.e., "NO" at 215). In such examples, based on that determination (i.e., "NO" at 215), instructions 122 may create, at 220, a downstream object at storage group 102 with an unmodified version of the upstream object name, which in this example is globalized object name "NAME2-G104-O159" that was already globalized by upstream storage group 104. In such examples instructions 122 may use the unmodified version of the upstream object name (i.e., globalized object name "NAME2-G104-O159") in at least some communications from storage group 102 to the upstream storage group 104 about the upstream object, since both the upstream and downstream objects will share the same globalized object name. Similarly, instructions 122 may process communications specifying object name "NAME2-G104-O159" against the downstream object without globalizing the object name. Such communications may be performed without globalizing or de-globalizing object names, as the communications are between globalized storage groups that utilize globalized object names in the global namespace (i.e., the communications do not cross the globalization barrier 195).

Although the flowchart of FIG. 2 shows a specific order of performance of certain functionalities, method 200 is not limited to that order. For example, the functionalities shown in succession in the flowchart may be performed in a different order, may be executed concurrently or with partial concurrence, or a combination thereof. In some examples, functionalities described herein in relation to FIG. 2 may be provided in combination with functionalities described herein in relation to any of FIGS. 1 and 3-6.

As noted above, an example globalized object name format was used in the example of FIG. 1 for simplicity of illustration and explanation. Another example is provided below illustrating another example of storage group identifiers and object identifiers.

In another example, the format of a storage group identifier may be a 16-digit hexadecimal string, and the format of an object identifier may be an 8-digit hexadecimal string. In such examples, the global namespace name pattern may be a string pattern defined to match strings with a prefix (e.g., one or more characters), followed by a suffix comprising a delimiter (e.g., "-"), followed by a 16-digit hexadecimal string, followed by a delimiter (e.g., "-"), and followed by an 8-digit hexadecimal string (i.e., <prefix>-<16-digit hexadecimal>-<8-digit hexadecimal>). Strings matching this global namespace name pattern may be in the global namespace.

As an example, a string matching the above global namespace name pattern may be, for example, "myvol-4dbe85d2cf4537f1-00000045". This may be an example of a globalized object name generated by instructions 122 of storage group 102 for an object having an object name of "myvol" at an upstream storage group, where the upstream group has a group identifier of "4dbe85d2cf4537f1" and the object has an object identifier of "00000045" within the storage group with the group identifier of "4dbe85d2cf4537f1".

In other examples, globalized object names may exclude the object identifier, and include a prefix and a suffix including the storage group identifier (but not including the object identifier). In such examples, the global namespace name pattern may be a string pattern defined to match strings with a prefix (e.g., one or more characters), followed by a suffix comprising a delimiter (e.g., "-"), followed by a 16-digit hexadecimal string (i.e., <prefix>-<16-digit hexadecimal>). Strings matching this global namespace name pattern may be in the global namespace. As an example, a string matching this global namespace name pattern may be, for example, "myvol-4dbe85d2cf4537f1". In such examples, the storage group identifier may provide uniqueness across the storage groups, and the prefix (i.e., the name on the storage group) may provide uniqueness within the storage group (e.g., when the storage group prevents object name collisions).

Although specific lengths, formats, and patterns are provided in examples above, any suitable length, format, or pattern may be used in examples herein. For example, a global namespace name pattern may be defined such that object names that match the global namespace name pattern are object names formed of a character string including a prefix and a suffix separated by a delimiter, wherein the suffix includes a first portion of a first length separated by a delimiter from a second portion of a second length. Although examples are described herein in relation to information added as a suffix to an object name, the added information may be added to the object name in any other suitable manner in examples herein (e.g., as a prefix, etc.).

In examples described herein, storage group identifiers may be unique across all storage groups. For example, storage group identifiers may be generated using existing techniques for generating a universally unique identifier (UUID), a globally unique identifier (GUID), or the like. In examples described herein, each object identifier may be unique within the storage group in which it was created. As such, in examples described herein, a globalized object name including a combination of a prefix and a suffix including a group identifier and an object identifier may be unique in the globalized namespace relative to other globalized object names in the globalized namespace, as objects from different storage groups won't collide because of the storage group identifiers in the names, and objects from the same storage group won't collide at least because of the object identifier.

Figure 3:
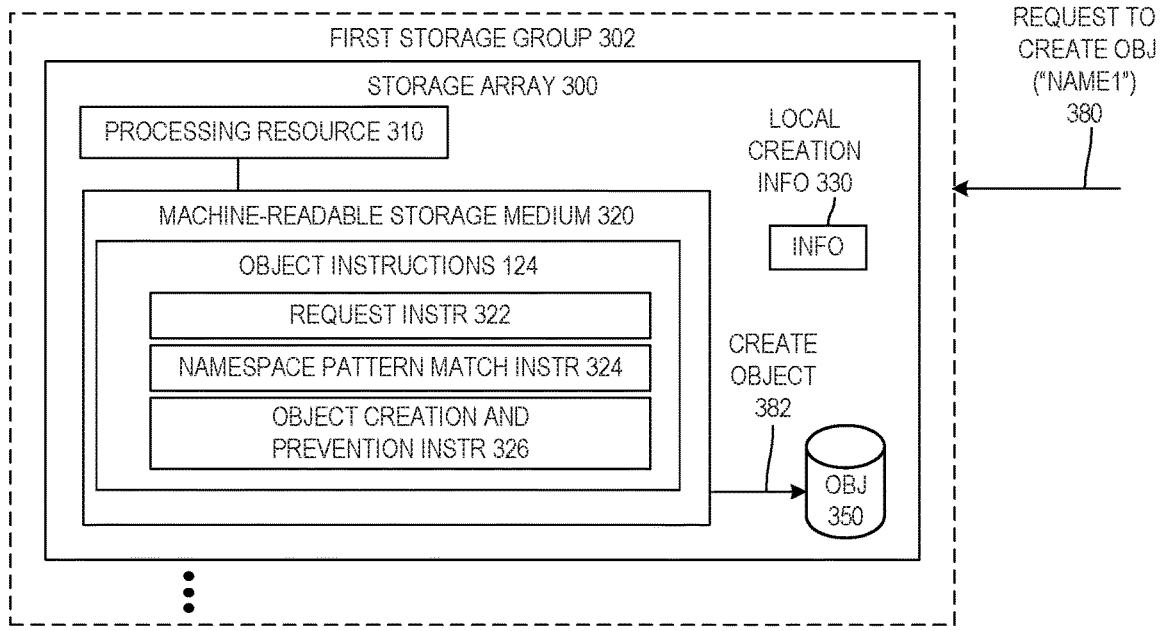
FIG. 3 is a block diagram of an example storage group to create a new object based on a request to create the new object with a specified name.

FIG. 3 is a block diagram of an example storage group 302 to create a new object based on a request 380 to create the new object with a specified name. In the example of FIG. 3, storage group 302 may be a collection of one or more storage arrays, including a storage array 300. In other examples, storage group 302 may be a storage array, such as storage array 300. In the example of FIG. 3, storage array 300 may include at least one processing resource 310, and at least one machine-readable storage medium 320 comprising (e.g., encoded with) at least instructions 124 that are executable by the at least one processing resource 310 of storage array 300 to implement functionalities described herein in relation to instructions 124. Instructions 124 may include at least instructions 322, 324, and 326, to implement the functionalities described herein in relation to those instructions.

In the example of FIG. 3, instructions 322 at storage group 302, when executed, may receive (e.g., passively receive, retrieve, acquire, etc.) a request 380 to create a new object with a specified object name (e.g., an object name specified in the request 380), such as "NAME1", for example. Instructions 322 may receive request 380 via any suitable input interface, such as an API, a GUI, a CLI, or the like, or a combination thereof. In some examples, instructions 322 may receive a request 380 that is input by a user (e.g., administrator or the like). In such examples, instructions 324 may determine whether the specified object name matches a global namespace name pattern for object names in a global namespace. Based on a determination that the specified object name matches the global namespace name pattern, instructions 326 may prevent the new object from being created at the storage group with the specified object name. In examples described herein, globalized storage groups may globalize object names by a uniform programmatic process. As such, in some examples, manual or programmatic requests for creation of objects with specified names that are in the global namespace may be prevented to prevent errors when subsequently performing the programmatic globalization process on the object names as described herein. For example, creation of objects with specified names that are in the global namespace may be prevented to prevent creation of an object having a specified object name in the global namespace that conflicts with a globalized object name (i.e., that was programmatically globalized by a globalization process as described herein).

Based on a determination that the specified object name does not match the global namespace name pattern, instructions 326 may create 382 the new object 350 on storage group 302 having the specified object name or a globalized version of the specified object name in the global namespace.

Figure 4:
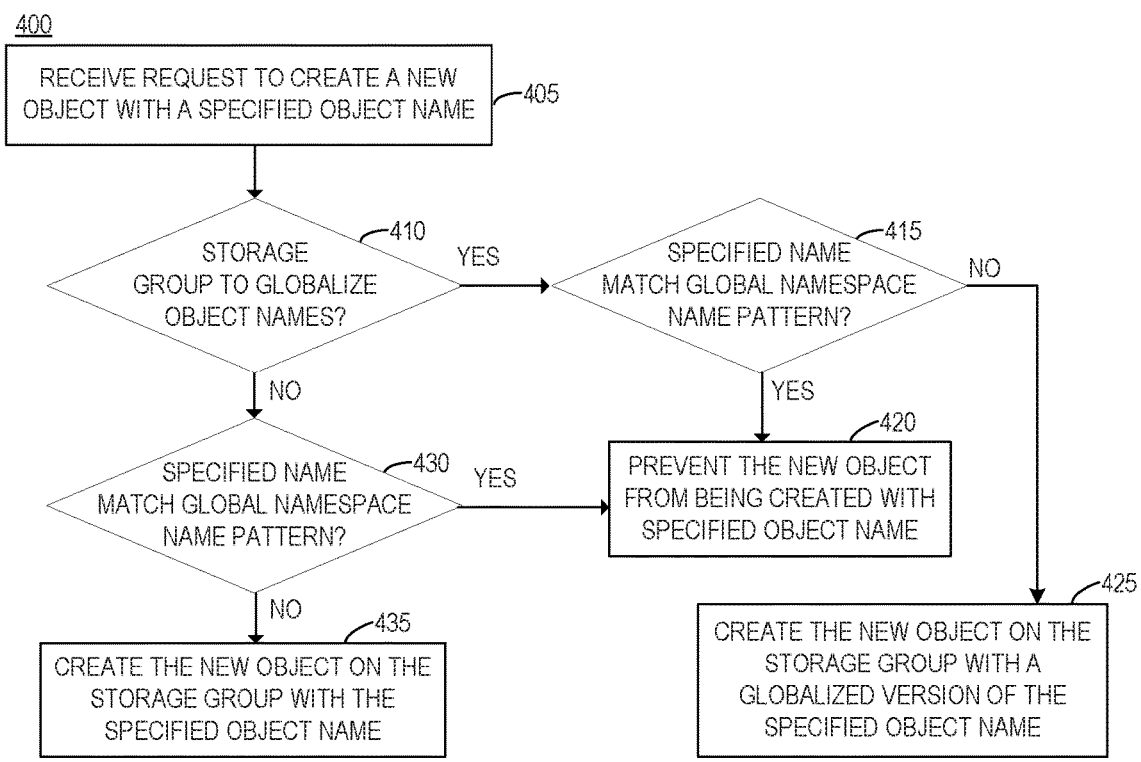
FIG. 4 is a flowchart of an example method 400 including creation of an object in response to a request to create an object with a specified name.

FIG. 4 is a flowchart of an example method 400 including creation of an object in response to a request to create an object with a specified name. Although execution of method 400 is described below with reference to storage group 302, other storage group(s), storage array(s), or computing device(s) suitable for the execution of method 400 may be utilized (e.g., storage groups 102 or 108 of FIG. 1). Additionally, implementation of method 400 is not limited to such examples.

Referring to FIGS. 3 and 4, at 405 of method 400, instructions 322, when executed, may receive, at storage group 302, a request 380 to create a new object with a specified object name. At 410, instructions 324 may determine whether the storage group comprises local name creation information 330 that indicates that storage group 302 is to globalize object names. In examples described herein, "local name creation information" stored at a storage group may be information that represents a setting for the storage group indicating whether the storage group is to globalize object names. Local name creation information may be stored in any suitable format, data structure, or the like. In some examples, local name creation information 330 of storage group 302 may indicate that storage group 302 is to globalize object names for use in storage group 302. In other examples, local name creation information 330 of storage group 302 may indicate that storage group 302 is not to globalize object names for use in storage group 302.

Returning to FIG. 4, in some examples, instructions 324 may determine at 410 that local name creation information 330 for storage group 302 indicates that storage group 302 is to globalize object names (e.g., for objects created on storage group 302) (i.e., "YES" at 410). In such examples, instructions 324 may determine at 415 whether the specified object name matches the global namespace name pattern. If so (i.e., "YES" at 415), then instructions 324 may prevent the new object from being created at the storage group with the specified object name at 420, as described above. If not (i.e., "NO" at 415), then at 425, instructions 326 may generate, from the specified object name (e.g., "NAME1"), a globalized object name matching the global namespace name pattern (e.g., "NAME1-G302-O350"), as described above, and then create the new object 350 on storage group 302 having the globalized version of the specified object name.

As an example, referring to the example of FIG. 1, storage group 102 may comprise instructions 124 described herein in relation to FIGS. 3 and 4, and may include local name creation information 130 indicating that that storage group 102 is to globalize object names (e.g., as represented by "GLOB." for information 130). In such examples, instructions 124 may receive a request 180 to create an object with an object name "NAME1", and based on a determination by instructions 124 that storage group 102 comprises local name creation information 130 that indicates that the storage group is to globalize object names ("YES" at 410), and a determination that the specified object name (e.g., "NAME1") does not match the global namespace name pattern ("NO" at 415), instructions 124 of storage group 102 may generate globalized object name "NAME1-G102-O150" and create 182 new object 150 with the globalized object name. In such examples, in 124 may further write data to the new object 150, once created, without the new object being in a replication relationship with any other object. In examples described herein, creation of a "new" object is distinguished from creation of a downstream object to receive replication of an upstream object. In some examples, as described above, storage group 102 may at least partially implement a multi-tenant replication environment.

Returning to the examples of FIGS. 3 and 4, in other examples, in response to request 380, instructions 324 may determine at 410 that local name creation information 330 for storage group 302 indicates that storage group 302 is not to globalize object names (e.g., for objects created on storage group 302) (i.e., "NO" at 410). In such examples, at 430, instructions 324 may determine whether the object name specified in request 380 matches the global namespace name pattern for object names in the global namespace. If instructions 324 determine that the specified object name matches the global namespace name pattern (i.e., "YES" at 430), then instructions 326 may prevent the new object from being created at the storage group with the specified object name. This may be to prevent potential errors when later globalizing and de-globalizing the name later, as the later de-globalizing of such a name may potentially cause a mismatch, as described above.

In other examples, if instructions 324 determine that the specified object name does not match the global namespace name pattern (i.e., "NO" at 435), then instructions 326 may create the new object 350 on storage group 302 having the specified object name at 435 (i.e., not a globalized version of the specified object name).

As an example, referring to the example of FIG. 1, storage group 108 may comprise instructions 128 that, when executed, may perform at least some of the functionalities described herein in relation to instructions 124. Storage group 108 may also include local name creation information 139 indicating that that storage group 108 is not to globalize object names (e.g., as represented by "LOCAL" for information 139). In such examples, instructions 128 may receive a request to create an object with an object name "NAME1", and based on a determination by instructions 128 that storage group 108 comprises local name creation information 139 that indicates that the storage group is not to globalize object names ("NO" at 410), and a determination that the specified object name (e.g., "NAME1") does not match the global namespace name pattern ("NO" at 430), instructions 128 of storage group 108 may create a new object 156 on storage group 108 having the specified object name (e.g., "NAME1"). In such examples, object 156 may be created as a new object that is not part of any replication relationship.

As such, examples described herein may create a new object on a storage group having a specified object name or a globalized version of the specified object name in the global namespace, based on the result of a determination of whether the storage group comprises local name creation information that indicates that the storage group is to globalize object names, and based on a determination that the specified object name does not match the global namespace name pattern. In some examples, functionalities described herein in relation to FIGS. 3 and 4 may be provided in combination with functionalities described herein in relation to any of FIGS. 1, 2, 5, and 6.

Figure 5:
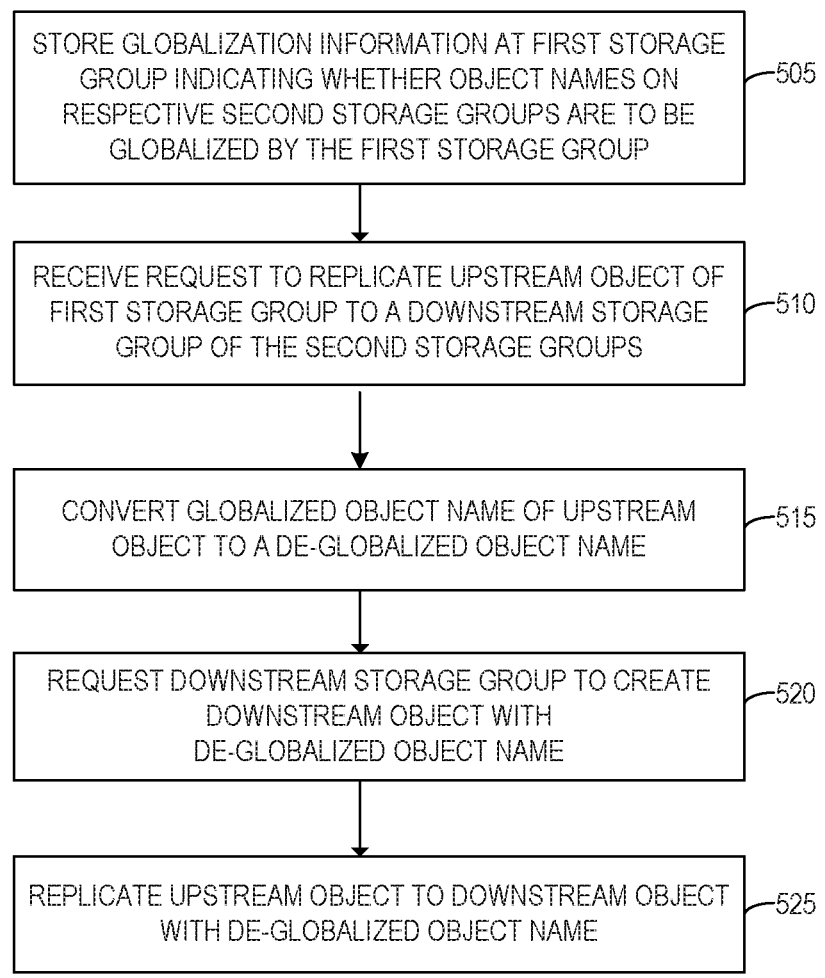
FIG. 5 is a flowchart of an example method including requesting a downstream storage group to create a downstream object with a de-globalized object name.

FIG. 5 is a flowchart of an example method 500 including requesting a downstream storage group to create a downstream object with a de-globalized object name. Although execution of method 500 is described below with reference to first storage group 102 of FIG. 1, other suitable environments for the execution of method 500 may be utilized (e.g., storage group 302 of FIG. 3). Additionally, implementation of method 500 is not limited to such examples. For ease of description, storage group 102 of FIG. 1 may be referred to herein as a "first" storage group, and each of storage groups 104, 106, and 108 may be referred to herein as a "second" storage group.

At 505 of method 500, instructions 122 of first storage group 102 may store globalization information 140 indicating, for each respective second storage group of a plurality of second storage groups, whether incoming object names from (i.e., used on) the respective second storage group are to be globalized by first storage group 102. At 510, instructions 122 may receive (e.g., passively receive, retrieve, acquire, etc.) a request to replicate an upstream object 150 of first storage group 102 to a downstream storage group of the plurality of second storage groups. In some examples, the upstream object 150 may having a globalized object name in a global namespace at first storage group 102 (e.g., "NAME1-G102-O150"). Based on a determination that globalization information 140, stored at first storage group 102, indicates that incoming object names from the downstream storage group are to be globalized to the global namespace by first storage group 102, instructions 122 may convert the globalized object name (e.g., "NAME1-G102-O150") of the upstream object 150 to a de-globalized object name (e.g., "NAME1") that is not in the global namespace, at 515.

At 520, instructions 122 may request that the downstream storage group create the downstream object having the de-globalized object name (e.g., "NAME1). At 525, instructions 122 may replicate the upstream object 156 having the globalized object name (e.g., "NAME1-G102-O150") from first storage group 156 to the downstream object having the de-globalized object name (e.g., "NAME1") at the downstream storage group. In such examples, the replication at 525 may include copying the content (e.g., data, etc.) of upstream object 156 to the downstream object created at the downstream storage group.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4 and 6.

Figure 6:
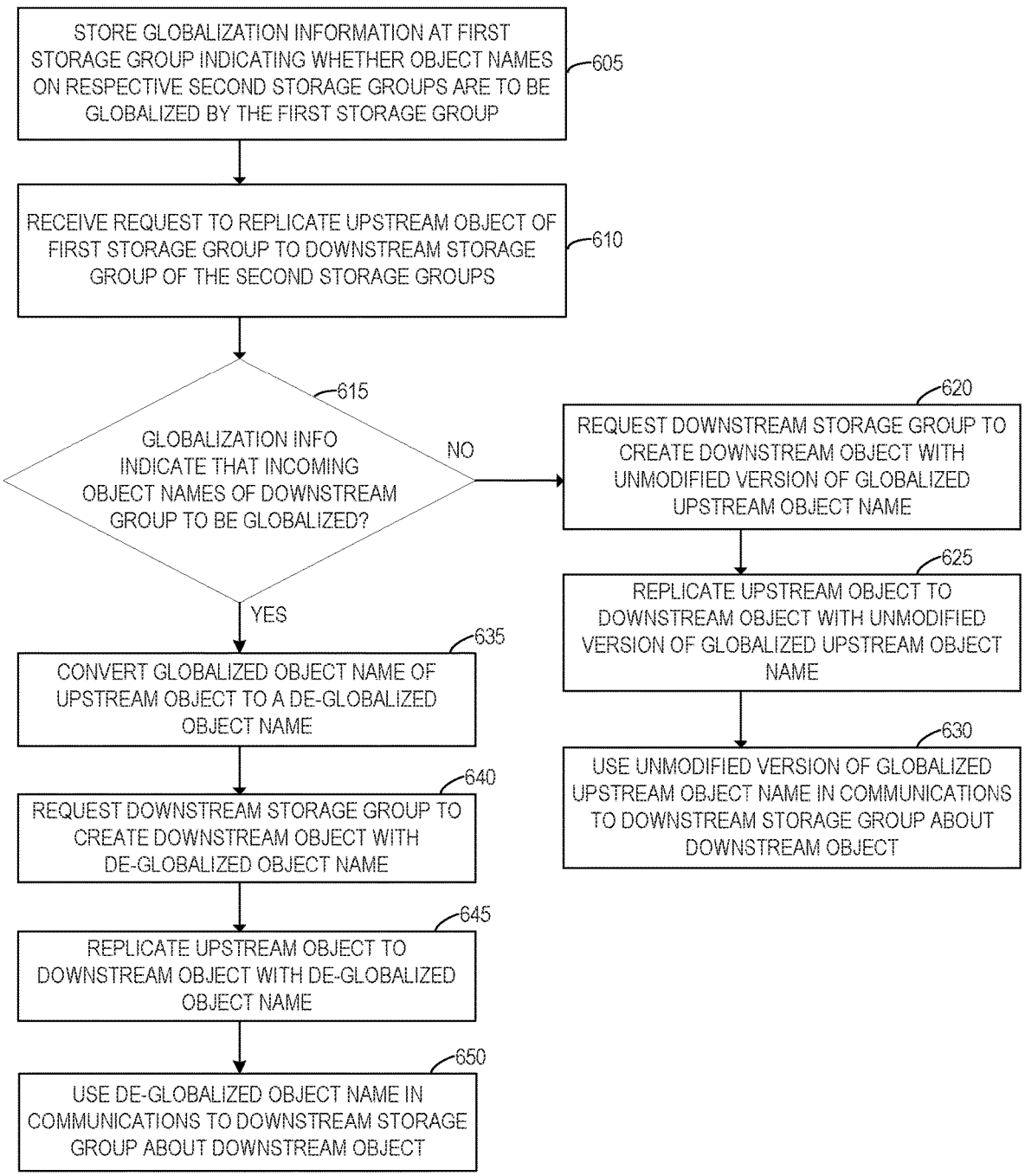
FIG. 6 is a flowchart of an example method including replicating an upstream object with a globalized object name to a downstream object.

FIG. 6 is a flowchart of an example method 600 including replicating an upstream object with a globalized object name to a downstream object. Although execution of method 600 is described below with reference to first storage group 102 of FIG. 1, other suitable environments for the execution of method 600 may be utilized (e.g., storage group 302 of FIG. 3). Additionally, implementation of method 600 is not limited to such examples. For ease of description, storage group 102 of FIG. 1 may be referred to herein as a "first" storage group, and each of storage groups 104, 106, and 108 may be referred to herein as a "second" storage group.

At 605 of method 600, instructions 122 of first storage group 102 may store globalization information 140 indicating, for each respective second storage group of a plurality of second storage groups, whether incoming object names from (i.e., used on) the respective second storage group are to be globalized by first storage group 102. At 610, instructions 122 may receive (e.g., passively receive, retrieve, acquire, etc.) a request to replicate an upstream object 150 of first storage group 102 to a downstream storage group of the plurality of second storage groups. In some examples, the upstream object 150 may having a globalized object name in a global namespace at first storage group 102 (e.g., "NAME1-G102-O150").

At 615, instructions 122 may determine whether globalization information 140, stored at first storage group 102, indicates that incoming object names from the downstream storage group are to be globalized to the global namespace by first storage group 102. If so ("YES" at 615), then instructions 122 may convert the globalized object name (e.g., "NAME1-G102-O150") of the upstream object 150 to a de-globalized object name (e.g., "NAME1") that is not in the global namespace, at 635. In some examples, the conversion at 625 may include removing, from the globalized object name (e.g., "NAME1-G102-O150"), a suffix (e.g., "-G102-O150") to generate a substring of the globalized object name as the de-globalized object name (e.g., "NAME1").

In such examples, at 640, instructions 122 may request that the downstream storage group create the downstream object having the de-globalized object name (e.g., "NAME1). At 645, instructions 122 may replicate the upstream object 156 having the globalized object name (e.g., "NAME1-G102-O150") from first storage group 156 to the downstream object having the de-globalized object name (e.g., "NAME1") at the downstream storage group. At 650, instructions 122 may use the de-globalized object name (e.g., "NAME1") in communications to the downstream storage group about the downstream object. In some examples, after 650, method 600 may return to 610 to receive and process another request to replicate an upstream object.

In other examples, instructions 122 may determine at 615 that globalization information 140, stored at first storage group 102, indicates that incoming object names from (i.e., used on) the downstream storage group are not to be globalized to the global namespace by first storage group 102 ("NO" at 615). For example, referring to FIG. 1, the downstream storage group may be storage group 104 which globalizes object names (i.e., is one of globalized groups 105). In such examples, instructions 122 may determine at 615 that globalization information 140 (e.g., information 140-4) indicates that storage group 102 is not to globalize incoming object names from storage group 104 ("NO" at 615).

In such examples, at 620, instructions 122 may request that the downstream storage group 104 create a downstream object 152 having the globalized object name (e.g., "NAME1-G102-O150") of the upstream object 150 (i.e., an unmodified version of the globalized object name of the upstream object 150). At 625, instructions 122 may replicate the upstream object 150 the globalized object name (e.g., "NAME1-G102-O150") from first storage group 102 to the downstream object 152 having the globalized object name (e.g., "NAME1-G102-O150") at the downstream storage group 140.

At 630, instructions 122 may use the globalized object name (e.g., "NAME1-G102-O150") in communications 184 to downstream storage group 104 about downstream object 152. Instructions 122 may similarly receive communications 186 from storage group 104 utilizing the globalized object name (e.g., "NAME1-G102-O150") for object 150, and may process those communication against object 150 without globalizing or de-globalizing the object name (e.g., "NAME1-G102-O150"). In some examples, after 630, method 600 may return to 610 to receive and process another request to replicate an upstream object. In some examples, after receiving a first request to replicate at 610, and processing the request via the "YES" branch from 615 (e.g., 635-650), instructions 122 may receive another request at 610, and process the request via the "NO" branch from 615 (e.g., 620-630).

Although the flowchart of FIG. 6 shows a specific order of performance of certain functionalities, method 600 is not limited to that order. For example, the functionalities shown in succession in the flowchart may be performed in a different order, may be executed concurrently or with partial concurrence, or a combination thereof. In some examples, functionalities described herein in relation to FIG. 6 may be provided in combination with functionalities described herein in relation to any of FIGS. 1-5.

In examples described herein, a storage array may be a computing device comprising a plurality of storage devices and one or more controllers to interact with host devices and control access to the storage devices. In some examples, the storage devices may include hard disk drives (HDDs), solid state drives (SSDs), or any other suitable type of storage device, or any combination thereof. In some examples, the controller(s) may virtualize the storage capacity provided by the storage devices to enable a host to access a virtual object (e.g., a volume) made up of storage space from multiple different storage devices.

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource of a storage array of a storage group to:

receive, at the storage group, a request to create a new object with a specified object name;

determine whether the specified object name matches a global namespace name pattern for object names in a global namespace;

based on a determination that the specified object name matches the global namespace name pattern, prevent the new object from being created at the storage group with the specified object name; and based on a determination that the specified object name does not match the global namespace name pattern:

create the new object on the storage group having the specified object name based on the storage group not comprising local name creation information that indicates that the storage group is to globalize object names; and create the new object on the storage group having a globalized version of the specified object name in the global namespace based on the storage group comprising the local name creation information that indicates that the storage group is to globalize object names.

2. The article of claim 1, the instructions comprising instructions executable to:

determine whether the storage group comprises the local name creation information that indicates that the storage group is to globalize object names.

3. The article of claim 1, the instructions comprising instructions executable to:

write data to the new object, once created, without the new object being in a replication relationship with any other object; and wherein the storage group is at least partially implementing a multi-tenant replication environment.

4. The article of claim 1, the instructions comprising instructions executable to:

receive a request to replicate the new object of the storage group to a downstream storage group of a plurality of other storage groups;

based on a determination that globalization information, stored at the storage group, indicates that incoming object names from the downstream storage group are to be globalized to the global namespace by the storage group, convert the globalized object name of the new object to a de-globalized object name that is not in the global namespace;

request that the downstream storage group create the downstream object having the de-globalized object name; and replicate the new object having the globalized object name from the storage group to the downstream object having the de-globalized object name at the downstream storage group.

5. The article of claim 1, the instructions comprising instructions executable to:

store the globalization information at the storage group, wherein the globalization information is to indicate, for each respective other storage group of the plurality of other storage groups, whether incoming object names from a respective other storage group are to be globalized by the storage group.

6. The article of claim 1, wherein the global namespace name pattern is defined such that object names that match the global namespace name pattern are object names formed of a character string including a prefix and a suffix separated by a delimiter, wherein the suffix includes a first portion of a first length separated by a delimiter from a second portion of a second length.

7. The article of claim 1, wherein the storage group comprises more than one storage array.

8. A storage array, of a first storage group, comprising:
at least one processing resource; and
at least one non-transitory machine-readable storage medium comprising instructions executable by at least one processing resource to:
store, at the first storage group, globalization information indicating, for each respective second storage group of a plurality of second storage groups, whether incoming object names from a respective second storage group are to be globalized to a global namespace by the first storage group;
receive a request to create a downstream object on the first storage group to receive replication of an upstream object of an upstream storage group of the plurality of second storage groups, the request specifying an upstream object name of the upstream object at the upstream storage group;
create the downstream object at the first storage group with an unmodified version of the upstream object name based on the globalization information not indicating that incoming object names from the upstream storage group are to be globalized by the first storage group; and
create the downstream object at the first storage group with a globalized version of the upstream object name based on the globalization information indicating that incoming object names from the upstream storage group are to be globalized by the first storage group.

9. The storage array of claim 8, wherein the instructions comprise instructions executable to:
use the unmodified version of the upstream object name in at least some communications from the first storage group to the upstream storage group about the upstream object.

10. The storage array of claim 6, wherein:
globalized version of the upstream object name is in the global namespace.

11. The storage array of claim 10, wherein the instructions comprise instructions executable to:
receive, from the upstream storage group, a communication that specifies an object having the unmodified object name; and
based on a determination that the globalization information indicates that incoming object names from the upstream storage group are to be globalized by the first storage group:
process, at the first storage group, the communication in relation to the downstream object having the globalized version of the upstream object name.

12. The storage array of claim 10, wherein the instructions comprise instructions executable to:
based on a determination that the globalization information indicates that incoming object names from the upstream storage group are to be globalized by the first storage group:
convert the object name of the downstream object to a de-globalized object name that is not in the global namespace; and
use the de-globalized object name in a communication from the first storage group to the upstream storage group about the upstream object.

13. The storage array of claim 10, wherein the instructions comprise instructions executable to:
disallow creation of the downstream object at the first storage group, based on a determination that the globalization information indicates that incoming object names from the upstream storage group are to be globalized by the first storage group, and a determination that the unmodified upstream object name matches a global namespace name pattern for object names in a global namespace.

14. The storage array of claim 8, wherein:
the globalization information comprises a globalize object names flag for each second storage group whose object names are to be globalized to the global namespace by the first storage group, when incoming to the first storage group, to be used by the first storage group; and
the first storage group at least partially implements a multi-tenant replication environment utilizing the global namespace.

15. A method comprising:
storing, at a first storage group, globalization information indicating, for each respective second storage group of a plurality of second storage groups, whether incoming object names from a respective second storage group are to be globalized by the first storage group;
receiving a request to replicate an upstream object of the first storage group to a downstream storage group of the plurality of second storage groups, the upstream object having a globalized object name in a global namespace at the first storage group;
based on a determination that the globalization information, stored at the first storage group, indicates that incoming object names from the downstream storage group are to be globalized to the global namespace by the first storage group, converting the globalized object name of the upstream object to a de-globalized object name that is not in the global namespace:
requesting that the downstream storage group create the downstream object having the de-globalized object name; and
replicating the upstream object having the globalized object name from the first storage group to the downstream object having the de-globalized object name at the downstream storage group.

16. The method of claim 15, wherein the converting comprises:
removing, from the globalized object name, a suffix to generate a substring of the globalized object name as the de-globalized object name.

17. The method of claim 15, further comprising:
in response to a request to replicate another upstream object of the first storage group to another downstream storage group of the plurality of second storage groups:
requesting that the another downstream storage group create a given downstream object having a globalized object name of the another upstream object, based on a determination that the globalization information, stored at the first storage group, indicates that incoming object names from the another downstream storage group are not to be globalized to the global namespace by the first storage group.

* * * * *